(12) United States Patent
Johnston et al.

(10) Patent No.: US 7,883,097 B1
(45) Date of Patent: Feb. 8, 2011

(54) HEAVY TRUCK SWAY BAR ASSEMBLY

(75) Inventors: Brent Johnston, Milan, OH (US);
Ronald McLaughlin, Maumee, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 12/619,792

(22) Filed: Nov. 17, 2009

(51) Int. Cl.
*B60G 21/055* (2006.01)
(52) U.S. Cl. .............................. 280/124.107
(58) Field of Classification Search .............. 280/5.511, 280/124.106, 124.107, 124.137, 124.152, 280/124.166; 267/188, 273
See application file for complete search history.

(56) References Cited

U.S. PATENT DOCUMENTS

| | | | | |
|---|---|---|---|---|
| 5,062,656 A | * | 11/1991 | Hynds et al. | 280/124.152 |
| 5,064,216 A | * | 11/1991 | Hynds | 280/124.152 |
| 5,702,121 A | * | 12/1997 | Song | 280/124.152 |
| 7,178,815 B2 | * | 2/2007 | Cai et al. | 280/124.107 |
| 2003/0080526 A1 | * | 5/2003 | Conover | 280/124.106 |
| 2004/0056398 A1 | * | 3/2004 | Momiyama | 267/273 |
| 2007/0001417 A1 | * | 1/2007 | Minoshima | 280/124.107 |

\* cited by examiner

*Primary Examiner*—Paul N Dickson
*Assistant Examiner*—Robert A Coker
(74) *Attorney, Agent, or Firm*—Harness, Dickey & Pierce, PLC

(57) ABSTRACT

A sway bar assembly has a center spacer bar which is attached at each end to a lever arm. An elastomeric bushing assembly is disposed between the center spacer bar and each lever arm. At the end of the lever arms opposite to the center sway bar, an elastomeric bushing assembly is attached to each lever arm to facilitate attachment to the vehicle. The elastomeric bushing assembly between the lever arms and the center spacer bar includes an inner metal defined by the center spacer bar, an outer metal defined by the respective lever arm and an elastomeric bushing disposed between the inner and outer metals.

20 Claims, 3 Drawing Sheets

HEAVY TRUCK SWAY BAR ASSEMBLY

FIELD

The present disclosure relates to sway bars. More particularly, the present disclosure relates to a sway bar assembly which incorporates elastomeric articulation.

BACKGROUND

This section provides background information related to the present disclosure which is not necessarily prior art.

Sway bars or anti-roll bars are used in vehicles to adjust the torque of the suspension system which then influences the roll rate. Sway bars are typically torsional springs which act across an axle to introduce resistance to relative changes in the displacement of one wheel on the axle compared to the displacement of the other wheel on the same axle. The sway bar or torsion spring is constrained both radially and axially and it is connected to the suspension member by a lever arm or by a linkage. The torsional spring rate of the sway bar contributes to the roll stiffness for the vehicle. The lever arm or the linkage acts as a spring element which is designed to allow for compliance of the axle to the frame in the lateral direction.

Roll stiffness is important to both the ride comfort and the cornering ability of the vehicle. Too little roll stiffness results in excess body roll or lean and slow response to the rotation of the steering wheel by the driver. On the other hand, too much roll stiffness creates an uncomfortable ride and can cause a sudden loss of traction and the ability of the tires to stick to the road during cornering maneuvers.

FIG. 5 illustrates a typical prior art sway bar assembly 100. Sway bar assembly 100 includes a center spacer bar or torsional spring 102 and a pair of lever arms 104 attached to the opposite ends of center spacer bar 102. Center spacer bar 102 is attached to the frame using a pair of elastomeric bushings 106. The ends of center spacer bar 102 include an enlarged portion 108 which facilitates the connection of lever arms 104. Lever arms 104 are welded to enlarged portions 108 and enlarged portions 108 provide for an increase in the length of weld between lever arms 104 and center spacer bar 102. The ends of lever arms 104 opposite to center spacer bar 102 are attached to an elastomeric bushing assembly 110 which is utilized to connect lever arms 104 to the axle of the vehicle. Each elastomeric bushing assembly 110 includes an outer housing 112, a center pin 114 and an elastomeric bushing 116 disposed between outer housing 112 and center pin 114.

There are several critical issues for the design of sway bar assembly 100. The welding between lever arms 104 and center spacer bar 102 are critical. Should this weld fail, the system fails and the control and handling of the vehicle would be compromised. Lever arms 104 act as spring elements which are designed to allow for compliance of the axle to the frame in the lateral direction. Lever arms 104 are typically manufactured from complex alloy steels which are developed to withstand the frequent cycle loading which occurs during normal operation. Lever arms 104 are relatively thin in the vertical direction to allow for flexing of lever arms 104 to provide the necessary lateral compliance. Typically, to increase the fatigue strength of lever arms 104, a shot peening process is performed to introduce compressive stresses in the surface of lever arms 104. Any failure of lever arms 104 will cause the loss of the complete function of sway bar assembly 100. Should there be a failure of one of lever arms 104, the individual lever arm 104 cannot be replaced, the entire sway bar assembly 100 must be replaced. Also, to provide adequate strength for sway bar assembly 100, complex heat treatment of lever arms 104 and center spacer bar 102 is required. Typically, this heat treatment is performed after the welding of lever arms 104 to center spacer bar 102 making it bulky and difficult to handle through the heat treatment process. This makes it susceptible to warpage which requires a complex fixture during the heat treatment process and the possibility that a post heat treatment straightening operation is required at added expense.

SUMMARY

This section provides a general summary of the disclosure, and is not a comprehensive disclosure of its full scope or all of its features.

The present disclosure provides a sway bar assembly where the welded connections between the lever arms and the center spacer bar are replaced with elastomeric bushings. The elastomeric bushings provide the soft lateral spring rates while providing a very stiff rate in the vertical direction allowing the sway bar assembly to react to input forces requiring the sway bar assembly to couple the two wheels together to provide the required vehicle stability. Because the elastomeric bushing provides the lateral flexing and the vertical stiffness, the complex lever arm of the prior art sway bar assembly is not required. Instead, a thicker and more rigid lever arm can be manufactured from a lower grade material which is not required to be heat treated, significantly reducing the costs associated with the sway bar assembly. In addition, the process of upsetting the ends of the center spacer bar can be eliminated since they can be replaced by a relatively simple ninety degree bend of the center spacer bar at each end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
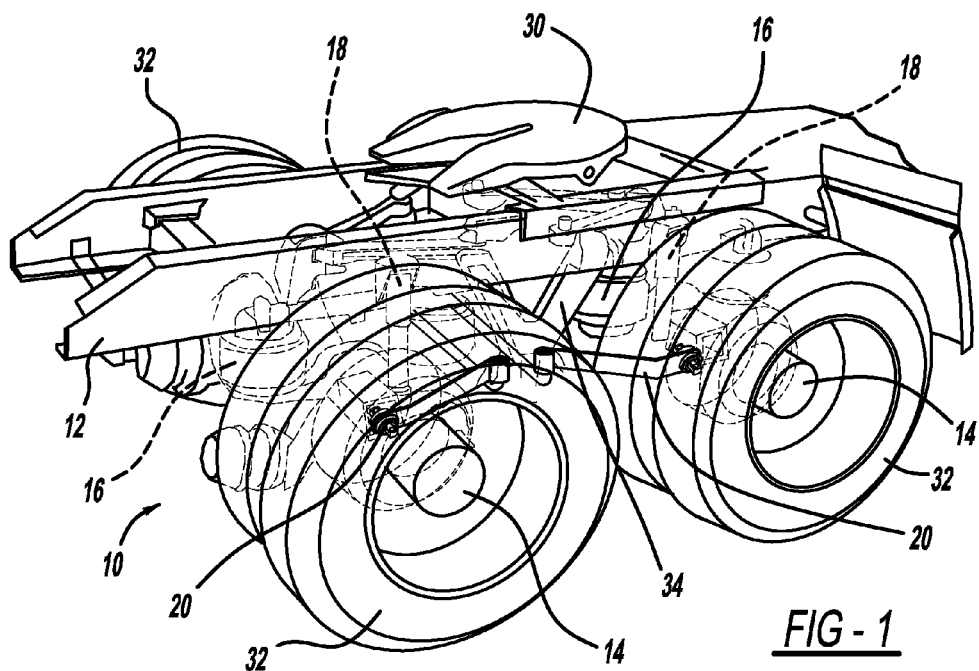
FIG. 1 is a perspective view of the installation of a sway bar assembly in accordance with the present disclosure.

Referring now to the drawings in which like reference numerals designate like or corresponding parts throughout the several views, there is illustrated in FIG. 1 a typical vehicle suspension 10. Vehicle suspension system 10 comprises a frame or support member 12 (sprung component), a pair of axle assemblies 14 (unsprung component), a plurality of springs 16, a plurality of shock absorbers 18 and a pair of sway bar assemblies 20. While sway bar assemblies 20 are illustrated in conjunction with a typical truck suspension, it is within the scope of the present disclosure to utilize sway bar assemblies in any vehicle suspension system.

Frame or support member 12 supports a fifth-wheel 30 which is utilized for the attachment of a trailer or other component to a cab (not illustrated) also supported by frame or support member 12. Each axle assembly 14 supports a plurality of road wheels 32 as is well known in the art. Frame or support member 12 is attached to each of axle assemblies 14 using four springs 16. Springs 16 are illustrated as air springs but it is within the scope of the present disclosure to utilize any type of spring in vehicle suspension system 10. A pair of shock absorbers 18 extend between frame or support member 12 and each axle assembly 14 to dampen the motion between frame or support member 12 and axle assembly 14.

Each sway bar assembly 20 is attached between a respective axle assembly 14 and frame or support member 12. As illustrated in FIG. 1, a mounting bracket 34 mounts the center portion of each sway bar assembly 20 to each side of frame or support member 12 (only one side illustrated in FIG. 1) and the ends of each sway bar assembly are mounted to opposite sides of a respective axle assembly 14 adjacent a respective road wheel 32.

Figure 2:
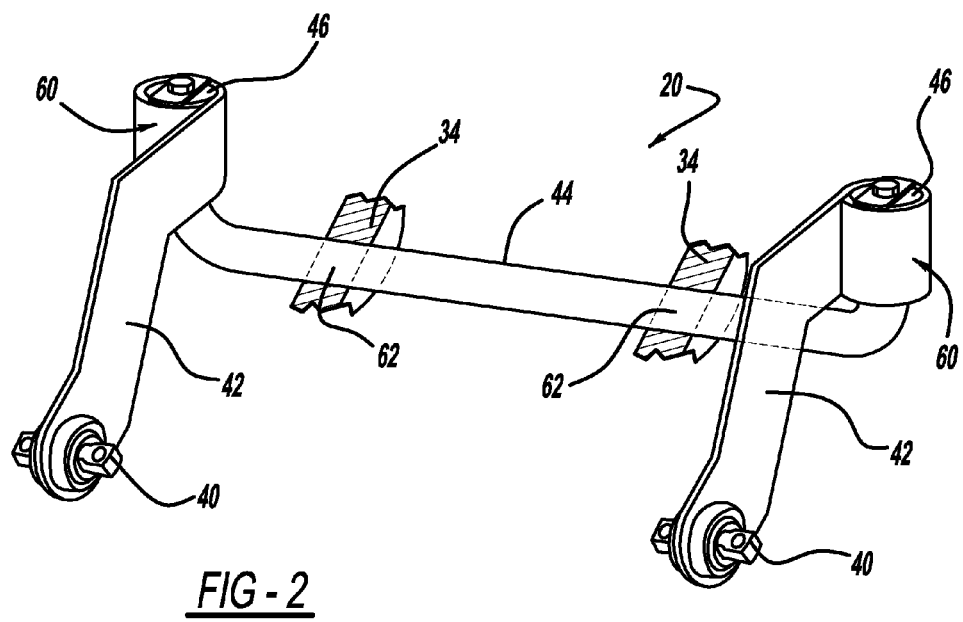
FIG. 2 is a perspective view of the sway bar assembly and center spacer bar mounts illustrated in FIG. 1.
Figure 3:
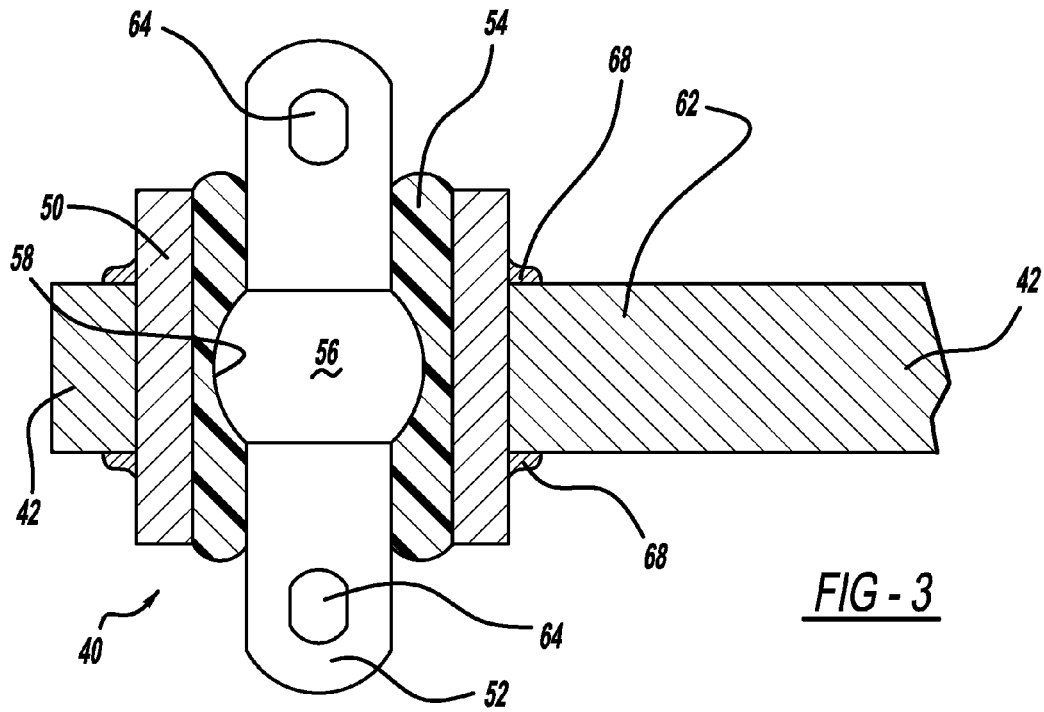
FIG. 3 is a cross-sectional view of one of the elastomeric bushing assemblies utilized to attach the lever arm to the axle.
Figure 4:
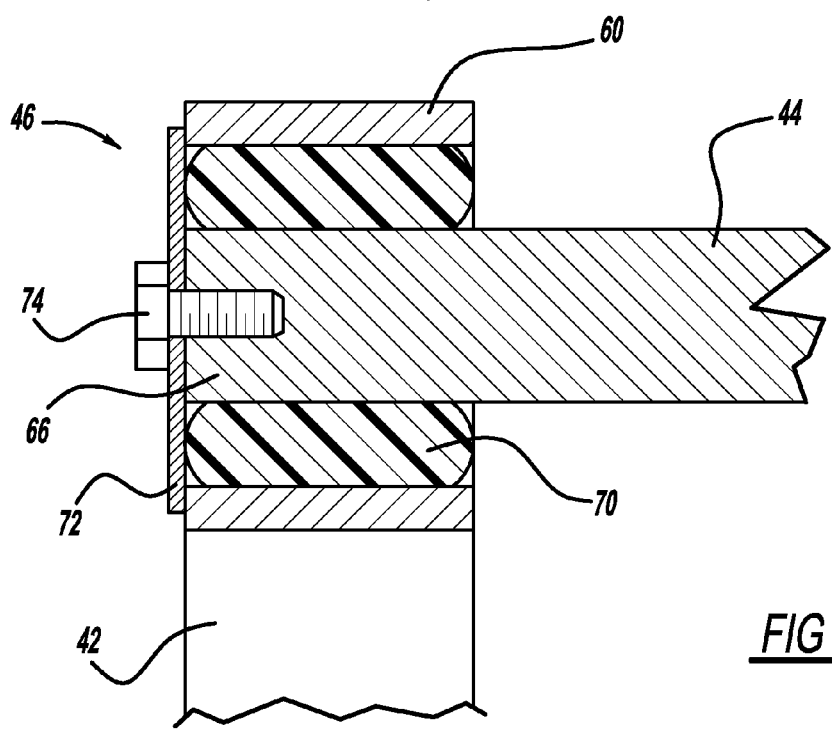
FIG. 4 is a cross-sectional view of one of the elastomeric bushing assemblies which attach the lever arms to the center sway bar.
Figure 5:
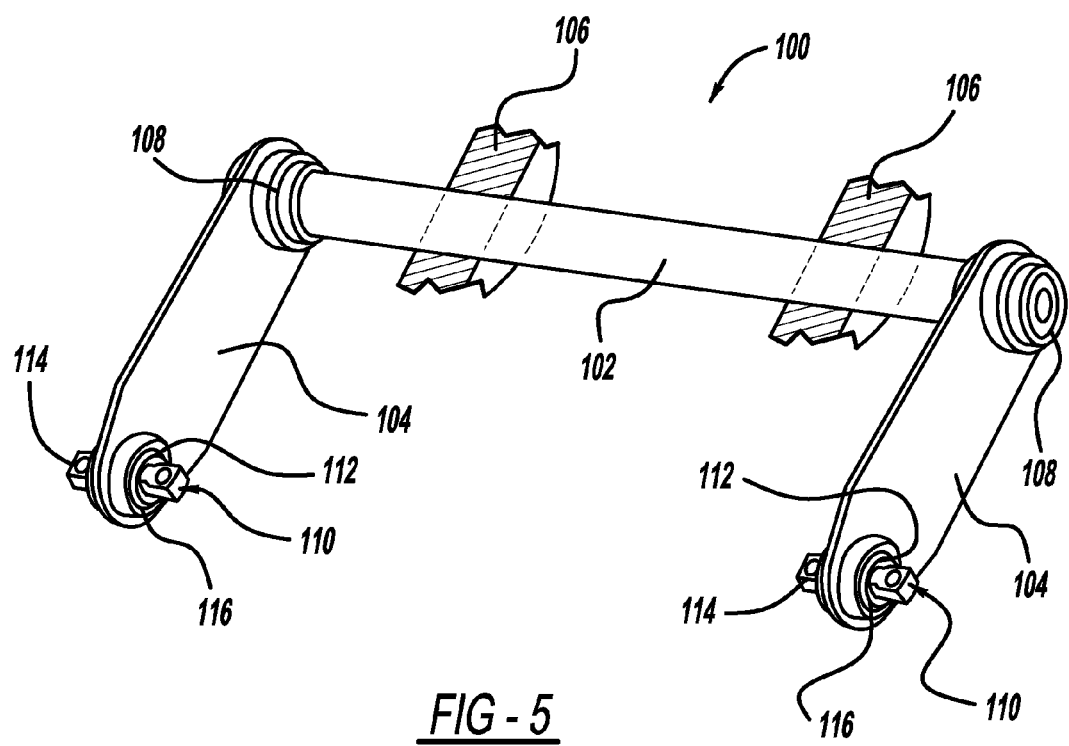
FIG. 5 is a perspective view of a prior art sway bar assembly.

Referring now to FIGS. 2-4, sway bar assembly 20 and mounting brackets 34 are illustrated in greater detail. Sway bar assembly 20 comprises a pair of axle mounts in the form of elastomeric bushing assemblies 40, a pair of lever arms 42, a center spacer bar 44 and a pair of elastomeric bushing assemblies 46 attaching lever arms 42 to center spacer bar 44.

Elastomeric bushing assembly 40 comprises an outer housing 50, an inner bar 52 and an elastomeric bushing 54 disposed between outer housing 50 and inner bar 52. As illustrated, inner bar 52 includes a centrally located ball 56 which is disposed within a pocket 58 defined by elastomeric bushing 54. Inner bar 52 also includes a pair of holes 64 which are utilized for the attachment of sway bar assembly 20 to axle assemblies 14. While sway bar assembly 20 is illustrated using two identical elastomeric bushing assemblies 40, it is within the scope of the present invention to utilize two different elastomeric bushing assemblies to accommodate a specific application. As illustrated in FIG. 3, a line connecting the centers of the pair of holes 64 defines an axial centerline of elastomeric bushing assembly 40.

Each lever arm 42 is a generally rectangular cross-sectioned component which is attached at one end to outer housing 50 of elastomeric bushing assembly 40 by welding as illustrated at 68 or any other method known in the art. The opposite end of lever arm 42 defines a circular housing 60 which forms the outer housing for elastomeric bushing assembly 46 as detailed below. Each lever arm 42 can include offsets or bends in the various planes in order to fit into a specific vehicle. While each lever arm 42 has the same configuration in sway bar assembly 20, it is within the scope of the present invention to have different bends and offsets in each lever arm 42 in order to fit a specific application. Also, while each lever arm 42 is illustrated as a generally rectangular cross-section component, lever arm 42 can be replaced with a fabricated component instead, this fabricated component can be cast or forged, it can be a flat element or it can be designed with a structural shape such as I-beam, C-channel or others. Lever arm 42 can be manufactured from steel, aluminum, composite or any other material providing the required strength and reliability.

Center spacer bar 44 extends between the lever arms 42 and define an attachment portion 62 which are designed to engage mounting brackets 34. Each end of center spacer bar 44 is bent at approximately ninety degrees to form an inner metal 66 for elastomeric bushing assembly 46.

Elastomeric bushing assemblies 46 attach lever arms 42 to center spacer bar 44. Elastomeric bushing assembly 46 comprises inner metal 66 which is the bent end of center spacer bar 44, an outer metal defined by circular housing 60 formed by lever arm 42, an elastomeric bushing 70 disposed between inner metal 66 and circular housing 60 and a retainer 72. Elastomeric bushing 70 is in a compressed state when it is disposed between inner metal 66 and circular housing 60. Retainer 72 is fastened to the end of inner metal housing 66 using a bolt 74 or by any other means known in the art. Retainer 72 prohibits circular housing 60 from walking off elastomeric bushing 70 and inner metal 66. As illustrated in FIG. 4, a centerline of inner metal 66 which is the bent end of center spacer bar 44 defines an axial centerline of elastomeric bushing 46.

When sway bar assembly 20 is installed in a vehicle, lateral motion of axle assembly 14 is resisted by the co-axial rotation of circular housing 60 with respect to inner metal 66. As illustrated in FIGS. 1 and 2, the axial centerline of elastomeric bushing 40 is generally parallel to center spacer bar 44 and generally perpendicular to the axial centerline of elastomeric bushing assembly 46. Elastomeric bushing 70 resists this rotation and the load to rotate circular housing 60, which is the spring rate of lever arm 42, is controlled by the percent compression of elastomeric bushing 70, the width of elastomeric bushing 70 as well as other characteristics of elastomeric bushing assembly 46. The anti-roll characteristics for sway bar assembly 20 are generated when circular housing 60 rotates with respect to inner metal 66 in a direction generally perpendicular to the axial centerline of inner metal 66 and the axial centerline of circular housing 60. This rotation will cause the further compression of elastomeric bushing 70 and the torsional wind-up of center spacer bar 44 to produce the anti-roll characteristics. Assuming an X-axis is defined as extending through the centerline of inner metal 66 and circular housing 60, the lateral loads on lever arm 42 cause rotation around this X-axis. Assuming that a Y-axis is defined as extending through the centerline of center spacer bar 44, the anti-roll characteristics are caused by rotation about an axis generally parallel to this Y-axis which causes the wind-up or rotation of center spacer bar 44 around this Y-axis.

Sway bar assembly 20 eliminates the complex welding of the prior art lever arms to the center spacer bar by replacing this weld with elastomeric bushing assembly 46. Elastomeric bushing assembly 46 also eliminates the complexities involved with the manufacturing of the prior art lever arms including the need for complex alloy steels, the elimination of the thin spring element and the issues related to fatigue strength and the elimination of the shot peening process and its associated costs. Sway bar assembly 20 also permits for the heat treatment of center spacer bar 44 as an individual component eliminating the need for the complex fixturing of the prior art sway bar assembly. Other advantages for sway bar assembly 20 over the prior art include the ability to be rebuilt if wear over time becomes an issue. Rebuilding consists replacing elastomeric bushing assembly 46. Also, sway bar assembly 20 is lower in cost due to the elimination of many processes including the full assembly heat treat, the straightening operation, shot peening, upsetting of the ends of the center spacer bar, welding of the lever arms to the center spacer bar and the complex forming of the lever arms including the use of special alloy steels. Finally, if elastomeric bushing assembly 46 should fail, the spring rate of sway bar assembly 20 would be reduced but the joint between lever arms 42 and center spacer bar 44 would remain intact and will function to a limited degree. This will allow sway bar assembly 20 to maintain a significant amount of the roll stiffness and vehicle control unit the time that sway bar assembly 20 is rebuilt or replaced.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A sway bar assembly comprising:
    a first lever arm;
    a first elastomeric bushing assembly disposed at a first end of said first lever arm, said first elastomeric bushing including an outer housing attached to said first lever arm, an inner bar disposed within said outer housing and a first elastomeric bushing disposed between said inner bar and said outer housing, said inner bar defining an axial centerline of said first elastomeric bushing assembly;
    a second lever arm;
    a center spacer bar disposed between said first and second lever arms; and
    a second elastomeric bushing assembly disposed between a second end of said first lever arm and said center spacer bar; wherein
    said axial centerline of said first elastomeric bushing assembly is generally parallel to said center spacer bar.

2. The sway bar assembly according to claim 1, wherein said second elastomeric bushing assembly comprises an inner metal, an outer metal and a second elastomeric bushing disposed between said inner metal and said outer metal, said inner metal defining an axial centerline of said second elastomeric bushing; wherein
    said axial centerline of said second elastomeric bushing is generally perpendicular to said axial centerline of said first elastomeric bushing.

3. The sway bar assembly according to claim 2, wherein said inner metal is defined by an end of said center spacer bar.

4. The sway bar assembly according to claim 3, wherein said end of said center spacer bar is bent to define said inner metal.

5. The sway bar assembly according to claim 3, wherein said outer metal is defined by said first lever arm.

6. The sway bar assembly according to claim 2, wherein said outer metal is defined by said first lever arm.

7. The sway bar assembly according to claim 2, wherein said inner metal is attached to said center spacer bar.

8. The sway bar assembly according to claim 7, wherein said outer metal is attached to said first lever arm.

9. The sway bar assembly according to claim 2, wherein said outer metal is attached to said first lever arm.

10. The sway bar assembly according to claim 1, further comprising a second elastomeric bushing assembly disposed between said second lever arm and said center spacer bar.

11. The sway bar assembly according to claim 10, wherein said first elastomeric bushing assembly comprises a first inner metal, a first outer metal and a first elastomeric bushing disposed between said first inner metal and said first outer metal, and said second elastomeric bushing assembly comprises a second inner metal, a second outer metal and a second elastomeric bushing disposed between said second inner metal and said second outer metal.

12. The sway bar assembly according to claim 11, wherein said first inner metal is defined by a first end of said center spacer bar and said second inner metal is defined by a second end of said center spacer bar.

13. The sway bar assembly according to claim 12, wherein said first end of said spacer bar is bent to define said first inner metal and said second end of said spacer bar is bent to define said second inner metal.

14. The sway bar assembly according to claim 12, wherein said first outer metal is defined by said first lever arm and said second outer metal is defined by said second lever arm.

15. The sway bar assembly according to claim 11, wherein said first outer metal is defined by said first lever arm and said second outer metal is defined by said second lever arm.

16. The sway bar assembly according to claim 11, wherein said first inner metal and said second inner metal are attached to said center spacer bar.

17. The sway bar assembly according to claim 16, wherein said first outer metal is attached to said first lever arm and said second outer metal is attached to said second lever arm.

18. The sway bar assembly according to claim 11, wherein said first outer metal is attached to said first lever arm and said second outer metal is attached to said second lever arm.

19. The sway bar assembly according to claim 1, further comprising a retainer attached to said center spacer bar and said first lever arm.

20. A sway bar comprising:
    a first lever arm defining a first hole extending through a first end of said first lever arm and a second hole extending through a second end of said first lever arm opposite to said first end, an axial centerline of said first hole extending in a direction non-parallel to an axial centerline of said second hole;
    a second lever arm;
    a center spacer bar disposed between said first and second lever arms, said center spacer bar extending through said second hole defined by said first lever arm;
    an elastomeric bushing disposed within said second hole defined by said first lever arm between said first lever arm and said center spacer bar.

* * * * *